United States Patent [19]

Buter et al.

[11] Patent Number: 5,721,294
[45] Date of Patent: Feb. 24, 1998

[54] AIR-DRYING AQUEOUS POLYMER DISPERSIONS

[75] Inventors: Roelof Buter, Dieren; Ingrid Gertruda Catharina Thijssen, Arnhem, both of Netherlands

[73] Assignee: Akzo Nobel NV, Arnhem, Netherlands

[21] Appl. No.: 781,608

[22] Filed: Jan. 16, 1997

Related U.S. Application Data

[63] Continuation of Ser. No. 183,453, Jan. 19, 1994, abandoned.

[30] Foreign Application Priority Data

Jan. 21, 1993 [NL] Netherlands ............................ 9300115

[51] Int. Cl.$^6$ ..................... C09D 151/08; C08F 8/14; C08F 299/04
[52] U.S. Cl. .................... 523/201; 523/501; 524/539; 525/444.5; 525/438; 525/902; 528/303
[58] Field of Search ..................... 523/201, 501; 528/303; 525/444.5, 438, 902; 524/539

[56] References Cited

U.S. PATENT DOCUMENTS

| | | | |
|---|---|---|---|
| 4,333,865 | 6/1982 | Zuckert et al. | 523/410 |
| 4,431,780 | 2/1984 | Dworak et al. | 525/444.5 |
| 4,447,567 | 5/1984 | Geerdes et al. | |
| 4,451,596 | 5/1984 | Wilk et al. | 523/501 |
| 4,518,724 | 5/1985 | Kuwajima et al. | 523/501 |
| 4,624,973 | 11/1986 | Kuwajima et al. | 523/221 |
| 4,914,139 | 4/1990 | Ruhoff et al. | 528/303 |

FOREIGN PATENT DOCUMENTS

| | | | |
|---|---|---|---|
| 0677371 | 1/1964 | Canada | 524/444.5 |
| 0083137 | 7/1983 | European Pat. Off. | C09D 3/66 |
| 0267562 | 5/1988 | European Pat. Off. | C09D 3/00 |
| 0295403 | 12/1988 | European Pat. Off. | C09D 3/64 |
| 0356920 | 3/1990 | European Pat. Off. | C09D 167/08 |
| 0469646A1 | 2/1992 | European Pat. Off. | C08F 299/02 |
| 0551942A2 | 7/1993 | European Pat. Off. | C09D 167/08 |
| 156087 | 7/1982 | Germany | C09D 3/66 |
| 238568A1 | 8/1985 | Germany | B27K 3/50 |

*Primary Examiner*—Andrew E. C. Merriam
*Attorney, Agent, or Firm*—Loretta A. Miraglia; Louis A. Morris

[57] ABSTRACT

The invention relates to an air-drying aqueous polymer dispersion based on a core/shell polymer having an alkyd resin in the core and an addition polymer grafted thereon, with 50–90 weight percent of the core/shell polymer being composed of alkyd resin and 50–10 weight percent being composed of addition polymer, and with the alkyd resin containing more than 40 and up to 80 weight percent of unsaturated fatty acid, at least 5 mole percent of which contains conjugated double bonds, having an acid number of not more than 5 (mg KOH/g), and having a number average molecular weight in the range of 400 to 5000, and with the addition polymer having an acid number in the range of 40 to 200 (mg KOH/g).

The aqueous polymer dispersions according to the invention were found to be highly stable and to have a comparatively low viscosity, even at concentrations of 40 weight percent and above. It was found that topcoats obtained using dispersions with a high alkyd resin content are virtually identical in terms of properties with topcoats obtained in a traditional manner using alkyd paints based on organic solvents, while the gloss of topcoats obtained using the polymer dispersions according to the invention frequently is even higher.

18 Claims, No Drawings

AIR-DRYING AQUEOUS POLYMER DISPERSIONS

This is a continuation of application Ser. No. 08/183,453 filed Jan. 19, 1994 now abandoned.

BACKGROUND OF THE INVENTION

1. Field of the Invention

The invention relates to an air-drying aqueous polymer dispersion based on a core/shell polymer with an alkyd resin in the core and an addition polymer grafted thereon, to a composite polymer dispersion obtained by emulsion polymerizing an addition polymer in the presence of said core/shell polymer, and to coating compositions based on said polymer dispersions.

2. Description of the Prior Art

Air-drying aqueous polymer dispersions based on a core/shell polymer with an alkyd resin in the core and an addition polymer grafted thereon have earlier been proposed in U.S. Pat. No. 4,518,724. The aqueous coating compositions described in this document comprise at least A) one aqueous resin selected from the group of acrylic resins, alkyd resins, polyester resins, acrylic-modified alkyd resins, and acrylic-modified polyester resins, and B) water-insoluble resinous particles having an average particle size of 0.3 to 6 µm obtained by the polymerization of ethylenically unsaturated compounds, and C) other additives if so desired. Example 39 is the only one in which there is any question of a core/shell polymer with an alkyd resin in the core and an addition polymer of styrene, methyl methacrylate, n-butyl acrylate, 2-hydroxyethyl methacrylate, and acrylic acid grafted thereon. The proportion of alkyd resin in the core/shell polymer amounts to only 23 percent, so the properties of a coating composition prepared with this polymer will be affected only slightly by the alkyd resin's presence. It is well-known that coating compositions based on a high percentage of alkyd resin stand out for rapid drying in open air and having a high gloss. However, up to now the known coating compositions which possess the favorable qualities just mentioned have been formulated on an organic solvents basis.

SUMMARY OF THE INVENTION

The present invention provides aqueous polymer dispersions based on alkyd resins which, when used in coating compositions, are in no way inferior to the known alkyd resin-containing coating compositions based on organic solvents.

This invention relates to an air-drying aqueous polymer dispersion of the known type mentioned in the opening paragraph wherein about 50–90 weight percent of the core/shell polymer is composed of alkyd resin and about 50–10 weight percent is composed of addition polymer, with the alkyd resin
  containing more than about 40 and up to 80 weight percent of unsaturated fatty acid, at least about 5 mole percent of which contains conjugated double bonds,
  having an acid number of not more than about 5 (mg KOH/g), and
  having a number average molecular weight in the range of about 400 to 5000, and
with the addition polymer having an acid number in the range of about 40 to 200 (mg KOH/g). Preferably, the core/shell polymer consists essentially of the alkyd resin and addition polymer in the proportions given.

The aqueous polymer dispersions according to the invention were found to be highly stable and to have a comparatively low viscosity, even at concentrations of 40 weight percent and above. It was found that the properties of topcoats obtained from dispersions with a high alkyd resin content are virtually identical with those of topcoats obtained in a traditional manner using alkyd paints based on organic solvents, the topcoats obtained from the polymer dispersions according to the invention even tending to have superior gloss.

DETAILED DESCRIPTION OF THE INVENTION

If an alkyd resin of sufficient hydrolytic stability is to be obtained, its acid number must not be higher than 5 (mg KOH/g). A low acid number for the alkyd resin (<5, preferably <2) may be obtained by, for non-limiting example, conversion with a glycidyl ester of a carboxylic acid or some other mono-epoxide. With an addition polymer acid number of less than 40, it was found to be impossible to form stable polymer dispersions, while an acid number of more than 200 resulted in dispersions which were insufficiently water-resistant.

It is also of importance that the alkyd resin contain more than 40 and up to 80 weight percent of unsaturated fatty acid, since otherwise it will not be possible to obtain topcoats that air-dry at room temperature or 100° C. In this connection it is of importance for at least 5 mole percent of unsaturated fatty acids present in the alkyd resin to contain conjugated double bonds for the benefit of the addition polymer's graft polymerization. Preferably, 10 to 50 mole percent of the unsaturated fatty acids will contain conjugated double bonds.

The procedure for preparing the polymer dispersions according to the invention generally is as follows. First, an alkyd resin solution is prepared in an organic solvent. Next, the alkyd resin is grafted to the addition polymer. To obtain a dispersion of sufficient stability it has been found to be advisable in this process to make use of an alkyd resin having a number average molecular weight in the range of 500 to 4000 and a dispersity (Mw/Mn) <4, preferably <2.

Particularly suitable aqueous polymer dispersions may be obtained when the alkyd resin is composed of:
  (a) n moles of an aromatic and/or cycloaliphatic dicarboxylic acid or an ester-forming equivalent thereof,
  (b) x moles of a triol having 3–12 carbon atoms, and/or y moles of a tetrafunctional alcohol having 4–13 carbon atoms, with $x+y=n+1$,
  (c) $(x+y)$ to $(x+y+2)$ moles of an unsaturated fatty acid, and
  (d) 2–10 weight percent of a glycidyl ester of a carboxylic acid according to formula (I):

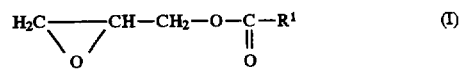
(I)

wherein $R^1$ is an alkyl group having 4–40 carbon atoms. Here, n preferably stands for a number in the range of about 1 to 5, which need not be an integer. In these descriptions "and/or" is used in the conventional sense, in which either or both of the stated ingredients can be present.

Favorable results may also be attained when the alkyd resin is composed of:
  (a) n moles of an aromatic and/or cycloaliphatic tricarboxylic acid or an ester forming equivalent thereof,
  (b) x moles of a diol having 2–12 carbon atoms, and/or y moles of a triol having 3–12 carbon atoms, with $x+y=2n+1$, (c) (x+y−1) to (2y+x+1−n) moles of an unsaturated fatty acid, and (d) 2–10 weight percent of a glycidyl ester of a carboxylic acid according to formula (I):

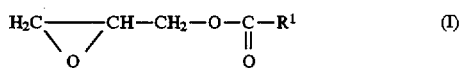

wherein $R^1$ represents an alkyl group having 4–40 carbon atoms. Here, n preferably stands for a number in the range of 1 to 3, which need not be an integer.

Examples of suitable cycloaliphatic or aromatic dicarboxylic acids or ester-forming equivalents thereof include: tetrahydrophthalic acid, tetrahydrophthalic anhydride, phthalic anhydride, endomethylene tetrahydrophthalic acid, hexahydrophthalic anhydride, hexachloroendomethylene tetrahydrophthalic acid, hexahydrophthalic acid, hexahydroterephthalic acid, phthalic acid, p-carboxymethyl benzoic acid, dichlorophthalic acid, tetrachlorophthalic acid, dimethyl terephthalate, dimethyl hexahydroterephthalate, naphthalene-2, 6-dicarboxylic acid, and diphenyl-o,o'-dicarboxylic acid.

Examples of suitable cycloaliphatic or aromatic tricarboxylic acids or ester-forming equivalents thereof include: 1,2,3-benzene tricarboxylic acid, 1,2,4-benzene tricarboxylic acid, 1,3,5-benzene tricarboxylic acid, trimellitic anhydrid, and hexahydrotrimellitic anhydride. The preferred dicarboxylic acids are carboxylic acids having 8–10 carbon atoms, such as isophthalic acid and terephthalic acid. The preferred tricarboxylic acids are trimellitic acid or the anhydride thereof.

When the polymer dispersions are employed in coating compositions that may come into contact with UV-light, it is preferred to make use of cycloaliphatic di- and/or tricarboxylic acids.

Examples of suitable diols for use in the preparation of the alkyd resins to be employed according to the invention include: ethylene glycol, 1,3-propanediol, 1,6-hexanediol, 1,12 dodecanediol, 3-methyl-1,5-pentanediol, 2,2,4-trimethyl-1, 6-hexanediol, 2,2-dimethyl-1, 3-propanediol, and 2-methyl-2-cyclohexyl-1, 3-propanediol.

Examples of suitable triols include: glycerol, 1,1,1-trimethylolethane, and 1,1,1-trimethylolpropane. A suitable tetrafunctional alcohol is pentaerythritol.

The number of unsaturated fatty acids eligible for use in the preparation of the alkyd resins to be employed according to the invention is exceedingly large. However, preference is given to the use of mono-and polyunsaturated fatty acids, preferably those containing 12–26 carbon atoms. Specific examples are mono-unsaturated fatty acids, such as myristoleic acid, palmitoleic acid, oleic acid, gadoleic acid, erucic acid, ricinolinic acid; bi-unsaturated fatty acids such as linoleic acid; tri-unsaturated acids, such as linolenic acid, eleostearic acid, and licanic acid; quadri-unsaturated fatty acids, such as arachidonic acid and clupanodonic acid, and other unsaturated fatty acids obtained from animal or vegetable oils. When natural fatty oils are employed, at least 80 weight percent thereof will be made up of the above-mentioned fatty acids or mixtures thereof.

At least 5 mole percent, and preferably 10–50 mole percent, of the unsaturated fatty acids has conjugated double bonds. One example of such an acid is conjugated linoleic acid. The optimum amount of fatty acids having conjugated double bonds is closely bound up with the nature of the monomers and initiators used for grafting the addition polymer onto the core.

Low acid numbers (lower than 2 mg KOH/g) and a narrow molecular weight distribution (an Mw/Mn dispersity of less than 2.5) may be obtained by reacting the alkyd having an acid number in the range of 5 to 20 with a mono-epoxide such as 1,2-epoxy- octane or, preferably, a glycidyl ester of a carboxylic acid according to formula I:

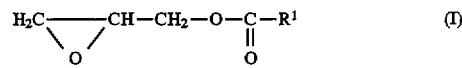

wherein $R^1$ represents an alkyl group having 4–40 carbon atoms.

The alkyd resins suitable for use according to the invention may be obtained by direct esterification of the constituent components, a portion of which may already have been converted into ester diols or polyester diols. Alternatively, the unsaturated fatty acids may be added in the form of a drying oil, such as linseed oil, tunafish oil, dehydrated castor oil, coconut oil, and dehydrated coconut oil. The final alkyd resin is then formed by transesterification with the other added acids and diols. This transesterification is commonly carried out at a temperature in the range of 115° to 250° C., optionally with solvents such as toluene and/or xylene being present. The reaction is generally carried out in the presence of a catalytic amount of a transesterification catalyst. The examples of transesterification catalysts suitable for use include p-toluene sulfonic acid, a basic compound such as an amine, or compounds such as zinc oxide, tetraisopropyl orthotitanate, and triphenylbenzylphosphonium chloride.

The core/shell polymer is obtained by the addition polymerization of free radical polymerizable monomers in the presence of the alkyd resin described hereinbefore. In this process, the addition polymer is linked to the alkyd resin by means of grafting to the unsaturated conjugated double bond of the fatty acid.

The core/shell polymer prepared according to the invention is easily dispersible in water after an at least partial neutralization of the carboxyl groups present in the shell of the core/shell polymer with the aid of triethylamine, dimethylethanolamine, KOH, LiOH, $Li_2CO_3$, or, preferably, with the aid of ammonia and the emulsifying in water of the thus neutralized core/shell polymer.

A wide range of radically polymerizable monomers is available to choose from for the addition polymer chains. Mention may be made in this connection of ethylenically unsaturated monocarboxylic acids, such as (meth)acrylic acid and crotonic acid; (cyclo)alkyl (meth)acrylates having 1–12 carbon atoms in the (cyclo)alkyl group, such as methyl (meth)acrylate, ethyl (meth)acrylate, propyl (meth)acrylate, isopropyl (meth)acrylate, butyl (meth)acrylate, isobutyl (meth)acrylate, 2-ethylhexyl (meth)acrylate, octyl (meth) acrylate, isobornyl (meth)acrylate, dodecyl (meth)acrylate, and cyclohexyl (meth)acrylate; dicarboxylic acids, such as maleic acid (and anhydride), fumaric acid, itaconic acid (and anhydride); (cyclo)alkyl esters of such dicarboxylic acids having 1–12 carbon atoms in the (cyclo)alkyl group, such as dimethyl maleate, diethyl maleate, diethyl fumarate, dipropyl maleate, dibutyl maleate, dibutyl fumarate, 2-ethylhexyl maleate, 2-ethylhexyl fumarate, octyl maleate, isobornyl maleate, dodecyl maleate, and cyclohexyl maleate; (meth) acrylates containing ether groups, such as 2-methoxyethyl methacrylate, 2-ethoxyethyl methacrylate, and 3-methoxypropyl methacrylate; hydroxyalkyl (meth) acrylates, such as 2-hydroxyethyl (meth)acrylate, 2-hydroxypropyl (meth)acrylate, 4-hydroxybutyl acrylate, 6-hydroxyhexyl acrylate, p-hydroxycyclohexyl (meth) acrylate; monovinyl aromatic compounds, such as styrene, vinyltoluene, α-methylstyrene, and vinylnaphthalene; other substituted (meth)acrylate compounds, such as (meth) acrylamide, (meth)acrylonitrile, N-methylol(meth)- acrylamide, and N-alkyl(meth)acrylamides; other mono-unsaturated compounds, such as vinyl chloride, vinyl acetate, vinyl propionate, and vinylpyrrolidone.

Favorable results were attained with a core/shell polymer of which the shell was obtained from a monomer mixture comprising:

20–50 mole percent of styrene and/or α-methylstyrene,
20–30 mole percent of (meth)acrylic acid, and
20–60 mole percent of some other mono-unsaturated compound.

Preferably such a monomer mixture consists essentially of these ingredients in the indicated proportions.

It was found that the stability of the polymer dispersions according to the invention can be increased still further by the incorporation into the core/shell polymer's shell of up to 20 weight percent of a hydroxypolyethylene glycol (meth) acrylate, a hydroxypolyethylene glycol/polypropylene glycol (meth)acrylate, a hydroxypolypropylene glycol (meth) acrylate, or an alkoxy derivative thereof. The molecular weight of the alkoxypolyoxyalkylene groups in these compounds is in the range of 500 to 3000, preferably in the range of 1000 to 2000.

Favorable results may likewise be obtained using the reaction product of an alkoxypolyoxyethylene/oxypropylene amine and a monoethylenically unsaturated monoisocyanate such as isocyanatoethyl methacrylate and dimethyl-m-isopropenyl-benzyl isocyanate.

Needless to say, the selection of the monomers and/or monomer mixtures is dependent on a number of factors, including the hybrid polymer's final application. In actual practice, it is quite easy for the skilled person to take these and other factors into account and adjust the monomers' selection in line with the envisaged use.

The graft polymerization of the ethylenically unsaturated monomers in the presence of the alkyd resin functionalized with conjugated double bonds is generally carried out in an inert atmosphere (e.g., of nitrogen) in the presence of a radical initiator. The reaction is preferably carried out in a water-miscible organic solvent at a temperature in the range of 60° to 200° C. The amount of organic solvent is usually in the range of 10 to 30 weight percent, calculated on the overall reaction mixture. Suitable examples of such a solvent are glycol ethers and propylene glycol ethers, such as methoxypropanol, butoxyethanol, isopropanol, diethylene glycol monobutyl ether, diethylene glycol monomethyl ether, dipropylene glycol monomethyl ether, propoxypropanol, diethylene glycol dimethyl ether, and N-methylpyrrolidone. In addition, there may be small amounts of water-immiscible organic solvents, such as methyl ethyl ketone and methyl isobutyl ketone.

Suitable radical initiators include: dibenzoyl peroxide, dicumyl peroxide, methyl ethyl ketone peroxide, cumene hydroperoxide, tert-butyloxy-2-ethylhexanoate, tert-butylperbenzoate, tert-butylcumylperoxide, di-tert-butylperoxide, di-tert-butylperoxy-3,5,5-trimethylcyclohexane, and 1,3-bis(tert-butyl)peroxyisopropylbenzene. Also suitable are mixtures of the aforementioned initiators. The selected amount to be used thereof is commonly in the range of about 0.05 to 10 weight percent, preferably in the range of 1 to 5 weight percent, calculated on the overall weight of the monomer mixture.

The invention further relates to an aqueous polymer dispersion in which 10–90 weight percent, preferably at least 30 weight percent, of the solids content is derived from a polymer dispersion according to the invention, and 90–10 weight percent, preferably at least 30 weight percent, is derived from an addition polymer obtained by emulsion polymerization in the presence of a polymer dispersion according to the invention.

A wide range of mono-ethylenically unsaturated monomers may be used to prepare this addition polymer, including: (cyclo)alkyl (meth)acrylates having 1–12 carbon atoms in the (cyclo)alkyl group, such as methyl (meth)acrylate, ethyl (meth)acrylate, propyl (meth)acrylate, isopropyl (meth)acrylate, butyl (meth)acrylate, isobutyl (meth) acrylate, 2-ethylhexyl (meth)acrylate, octyl (meth)acrylate, isobornyl (meth)acrylate, dodecyl (meth)acrylate, and cyclohexyl (meth)acrylate; monovinyl aromatic compounds, such as styrene, vinyltoluene, α-methylstyrene, and vinylnaphthalene; other substituted (meth)acrylate compounds, such as (meth)acrylamide, (meth)acrylonitrile, N-methylol (meth)-acrylamide, and N-alkyl (meth)acrylamides; other mono-unsaturated compounds, such as vinyl chloride, vinyl acetate, and vinyl propionate. In addition, use may be made in small quantities of: (cyclo)alkyl esters of dicarboxylic acids having 1–12 carbon atoms in the (cyclo)alkyl group, such as dimethyl maleate, diethyl maleate, diethyl fumarate, dipropyl maleate, dibutyl maleate, dibutyl fumarate, 2-ethylhexyl maleate, 2-ethylhexyl fumarate, octyl maleate, isobornyl maleate, dodecyl maleate, and cyclohexyl maleate; (meth)acrylates containing ether groups, such as 2-methoxyethyl methacrylate, 2-ethoxyethyl methacrylate, and 3-methoxypropyl methacrylate; hydroxyalkyl (meth) acrylates, such as 2-hydroxyethyl (meth)acrylate, 2-hydroxypropyl (meth)acrylate, 4-hydroxybutyl acrylate, 6-hydroxyhexyl acrylate, p-hydroxycy-clohexyl (meth) acrylate, hydroxypolyethylene glycol (meth)acrylates; hydroxypolypropylene glycol (meth)acrylates and alkoxy derivatives thereof.

During the emulsion polymerization process use may be made of anionic or non-ionic emulsifiers if so desired. The suitable anionic emulsifiers include: potassium laurate, potassium stearate, potassium oleate, sodium decyl sulfate, sodium dodecyl sulfate, sodium dodecyl benzene sulfonate, and sodium rosinate. As examples of nonionic emulsifiers may be mentioned: linear and branched alkyl polyethylene glycol and alkylaryl polyethylene glycol, polypropylene glycol ethers and thio ethers, alkyl phenoxypoly (ethyleneoxy)ethanols, such as the adduct of 1 mole of nonylphenol and 5–12 moles of ethylene oxide, or the ammonium salt of said adduct's sulfate.

During the emulsion polymerization process use may be made of conventional radical initiators in the usual amounts. The suitable radical initiators include: ammonium persulfate, sodium persulfate, potassium persulfate, bis(2-ethylhexyl)peroxydicarbonate, di-n-butyl peroxydicarbonate, t-butyl perpivalate, t-butyl hydroperoxide, cumene hydroperoxide, dibenzoyl peroxide, dilauroyl peroxide, 2,2'- azobisisobutyronitrile, and 2,2'azobis-2-methylbutyronitrile. The reducing agents suitable for use together with, say, a hydroperoxide include: thiosulfites, bisulfites, hydrosulfites, water-soluble amines, such as diethylenetriamine, triethylenetetramine, tetraethylenepentamine, N,N-dimethylethanolamine, N,N-diethylethanolamine, and reducing salts, such as cobalt sulfate, iron sulfate, nickel sulfate, and copper sulfate. Optionally, a chain length regulator, such as n-octyl mercaptan, dodecyl mercaptan, and 3-mercaptopropionic acid, may be employed.

The dispersed polymer particles may be composed of a physical mixture of an addition polymer, such as a polyacrylate, and an alkyd. However, if grafting occurs during the emulsion polymerization process, there may be partial chemical combination of the alkyd resin and the addition polymer, giving dispersed polymer particles partially made up of block polymers and graft polymers of alkyd polymers and addition polymers. The thus formed component latex has a solids content of 30 to 55 weight percent, preferably of about 35 to 50 weight percent.

The aqueous dispersions or emulsions according to the invention are preferably used for the formulation of coating compositions. When employed to this end, the dispersions may contain a variety of other additives common to the paint industry, such as pigments, extenders, dispersing agents, thixotropic and rheological agents, and siccatives. The group of siccatives is commonly taken to include the metal soaps of both alkaline earth metals and heavy metals of monovalent carboxylic acids, such as naphthenic acid, octanoic acid, or 2-ethylhexanoic acid. Independently active siccatives will contain Co, Mn, Fe, or Ce; co-active siccatives may contain Pb, Ca, Zn, Ba, or Zr. The siccatives are commonly used in an amount of 0.01 to 0.5 weight percent calculated on the coating composition's solids content. In addition, special emulsifiers may be incorporated into the coating compositions according to the invention in order to attain a spontaneous emulsification in water. Water-emulsifiable siccatives are commercially available. It is easy to determine experimentally which type of siccative will best suit every application. To acquire pot stability, an anti-skinning agent may be incorporated into the coating composition. Examples of anti-skinning agents are oximes, such as butyraldoxime and ethyl methyl ketoxime. In general, favorable results are attained when using an amount each of the siccative and the anti-skinning agent of 0.01 to 1 weight percent calculated on the amount of film forming constituents.

The coating compositions according to the invention may be applied onto any known substrate, such as wood, synthetic materials, and metals. Suitable application methods include rolling, spraying, sprinkling, dipping, and electrostatic spraying. Needless to say, the coating composition may also be applied by simple brushing.

The coating compositions may be dried and cured under a variety of conditions, e.g., at room temperature. Accelerated curing may be accomplished by baking at elevated temperatures in the range of, say, 30° to 80° C. over a period of 20 to 60 minutes.

The coating compositions according to the invention may be employed as primers or fillers as well as in clear and colored paints.

EXAMPLES

The invention will be further illustrated below with reference to the following, non-limiting examples.

In the following examples, the preparation of a number of stable aqueous alkyd emulsions and coating compositions according to the invention is described. The properties measured on these dispersions are listed in Table 1. The dispersion's average particle size given in this table was determined with the aid of dynamic light scattering, with the dispersions diluted to a solids content of about 0.1 weight percent. The viscosity was determined with a Brookfield viscometer (LV - 4; 60 revolutions per minute). The solids content was determined in accordance with ASTM Method No. 1644-59, with heating to 140° C. over a period of 30 minutes.

Preparation of the Alkyd Resins

Alkyd resin A

In a 3 l flask fitted with a stirrer, a thermometer, and condenser a mixture was homogenized which was composed of:

| | |
|---|---|
| 462 | g of hexahydrophthalic anhydride |
| 536 | g of 1,1,1-trimethylolpropane |
| 840 | g of sunflower oil fatty acid (containing 62 weight percent of linoleic acid) |
| 285 | g of unsaturated fatty acid (containing 65 weight percent of conjugated linoleic acid) |
| 0.75 | g of tetra-isopropyl-o-titanate |

The contents of the flask were heated to 160° C., at which temperature distillation of the water began. Over a period of hours the temperature was raised to 245° C., the acid number of the contents of the flask at this temperature being kept at <10 (mg KOH/g). Next, the reaction mixture was cooled to 180° C., and over a period of 30 minutes 100 g of glycidyl ester of 1,1-dimethyl-1-heptane carboxylic acid (Cardura E-10 ex Shell) were added to it. After a reaction time of 1 hour at 180° C. the acid number of the reaction mixture was 0.7 (mg KOH/g). The alkyd resin prepared in this manner had an Mw=3607, Mn=2016, and a dispersity Mw/Mn=1.79.

Alkyd resin B

In a manner analogous to that disclosed for alkyd resin A, an alkyd resin was prepared from the following constituents:

| | |
|---|---|
| 462 | g of hexahydrophthalic anhydride |
| 536 | g of 1,1,1-trimethylolpropane |
| 896 | g of sunflower oil fatty acid (containing 62 weight percent of linoleic acid) |
| 228 | g of unsaturated fatty acid (containing 65 percent of conjugated linoleic acid) |
| 0.75 | g of tetra-isopropyl-o-titanate |
| 100 | g of glycidyl ester of 1,1-dimethyl-1-heptane carboxylic acid |

The thus prepared alkyd resin had an acid number of 0.5 (mg KOH/g), Mw=3911, Mn=2137, and a dispersity Mw/Mn=1.83.

Alkyd resin C

In a manner analogous to that disclosed for alkyd resin A, an alkyd resin was prepared from the following constituents:

| | |
|---|---|
| 462 | g of hexahydrophthalic anhydride |
| 536 | g of 1,1,1-trimethylolpropane |
| 933.3 | g of sunflower oil fatty acid (containing 62 weight percent linoleic acid) |
| 190 | g of unsaturated fatty acid (containing 65 weight percent of conjugated linoleic acid) |
| 0.75 | g of tetra-isopropyl-o-titanate |
| 100 | g of glycidyl ester of 1, 1-dimethyl-1-heptane carboxylic acid |

The thus prepared alkyd resin had an acid number of 0.6 (mg KOH/g), Mw=3861, Mn=2096, and a dispersity Mw/Mn=1.84.

Alkyd resin D

In a manner analogous to that disclosed for alkyd resin A, an alkyd resin was prepared from the following constituents:

| | |
|---|---|
| 298.8 | g of isophthalic acid |
| 367.2 | g of pentaerythritol |
| 1323.0 | g of sunflower oil fatty acid (containing 62 weight percent of linoleic acid) |
| 192.4 | g of unsaturated fatty acid (containing 65 percent of conjugated linoleic acid) |

-continued

| | |
|---|---|
| 1 | g of tetra-isopropyl-o-titanate |
| 100 | g of glycidyl ester of 1,1-dimethyl-1-heptane carboxylic acid |

The prepared alkyd resin had an acid number of 1.8 (mg KOH/g), Mw=6559, Mn=2488, and a dispersity Mw/Mn= 2.64.

Alkyd resin E

In a manner analogous to that disclosed for alkyd resin A, an alkyd resin was prepared from the following constituents:

| | |
|---|---|
| 192 | g of trimellitic anhydride |
| 402 | g of 1,1,1-trimethylolpropane |
| 840 | g of sunflower oil fatty acid (containing 62 weight percent of linoleic acid) |
| 285 | g of unsaturated fatty acid (containing 65 weight percent of conjugated linoleic acid) |
| 0.75 | g of tetra-isopropyl-o-titanate |
| 50 | g of glycidyl ester of 1,1-dimethyl-1-heptane carboxylic acid |

The prepared alkyd resin had an acid number of 1.9 (mg KOH/g), Mw=8110, Mn=2084, and a dispersity Mw/Mn= 3.89.

Alkyd resin F

In a manner analogous to that disclosed for alkyd resin A, an alkyd resin was prepared from the following constituents:

| | |
|---|---|
| 277.2 | g of hexahydrophthalic anhydride |
| 367.2 | g of pentaerythritol |
| 1209.6 | g of sunflower oil fatty acid (containing 62 weight percent of linoleic acid) |
| 307.8 | g of unsaturated fatty acid (containing 65 percent of conjugated linoleic acid) |
| 0.9 | g of tetra-isopropyl-o-titanate |
| 100 | g of glycidyl ester of 1,1-dimethyl-1-heptane carboxylic acid |

The prepared alkyd resin had an acid number of 1.0 (mg KOH/g), Mw=4207, Mn=2321, and a dispersity Mw/Mn= 1.81.

Preparation of the Alkyd Resin/addition Polymer Dispersions

Example I

In a 6 l flask fitted with a stirrer, a thermometer, a reflux condenser, and a dropping funnel, a mixture was homogenized which was composed of:

975 g of alkyd resin A 180 g of dipropylene glycol monomethyl ether

The dropping funnel was filled with a homogeneous mixture of:

| | |
|---|---|
| 210.2 | g of styrene |
| 91.0 | g of acrylic acid |
| 101.0 | g of methyl methacrylate |
| 107.6 | g of butyl methacrylate |
| 15.2 | g of di-t-butyl peroxide |

After deaeration, the flask and the dropping funnel were brought under a nitrogen atmosphere. The contents of the flask were heated to 135° C., whereupon, with a temperature of 135° C. being maintained in the flask, the contents of the dropping funnel were added dropwise in 1 hour. Next, the reaction mixture was kept at this temperature for a further 5 hours, after which the contents of the flask were cooled to 90° C. and a homogeneous mixture of 49.4 g of ammonia (26.1 weight percent $NH_3$) and 300 g of water was added, followed by 1720 g of water over a period of 3 hours.

Example II

In a manner analogous to that disclosed in Example I, a dispersion was prepared, with the proviso that this time the dropping funnel was filled with a homogeneous mixture of:

| | |
|---|---|
| 210.2 | g of styrene |
| 91.0 | g of acrylic acid |
| 107.6 | g of methyl methacrylate |
| 101.0 | g of butyl methacrylate |
| 15.2 | g of di-t-butyl peroxide |

Example III

In a manner analogous to that disclosed in Example I, a dispersion was prepared, with the proviso that the mixture in the flask was composed of:

975 g of alkyd resin A 271 g of dipropylene glycol monomethyl ether, and that the dropping funnel this time was filled with a homogeneous mixture of:

| | |
|---|---|
| 260.2 | g of styrene |
| 112.6 | g of acrylic acid |
| 125.1 | g of methyl methacrylate |
| 133.3 | g of butyl methacrylate |
| 18.8 | g of di-t-butyl peroxide |

On conclusion of the reaction there was added to the contents of the flask at 90° C. a homogeneous mixture of:

| | |
|---|---|
| 54.6 | g of ammonia (26.8 weight percent of $NH_3$) and |
| 300 | g of water, | followed by the addition of 2025 g of water.

Example IV

In a manner analogous to that disclosed in Example I, a dispersion was prepared, with the proviso that this time the dropping funnel was filled with a homogeneous mixture of:

| | |
|---|---|
| 200.9 | g of styrene |
| 93.7 | g of acrylic acid |
| 48.3 | g of methyl methacrylate |
| 157.9 | g of butyl methacrylate |
| 24.2 | g of di-t-butyl peroxide |

The reaction was carried out at 130° C. On conclusion of the reaction there was added to the contents of the flask at 90° C. a homogeneous mixture of

| | |
|---|---|
| 49.5 | g of ammonia (26.8 weight percent $NH_3$) and |
| 300 | g of water, | followed by the addition of 1917 g of water.

Example V

In a manner analogous to that disclosed in Example I, a dispersion was prepared, with the proviso that the mixture in the flask was composed of:

| | |
|---|---|
| 325 | g of alkyd resin B |
| 60 | g of dipropylene glycol monomethyl ether, and that | the dropping funnel was filled this time with a homogeneous mixture of:

| | |
|---|---|
| 70.1 | g of styrene |
| 30.3 | g of acrylic acid |
| 33.7 | g of methyl methacrylate |
| 35.8 | g of butyl methacrylate |
| 5.1 | g of di-t-butyl peroxide |

On conclusion of the reaction there was added to the contents of the flask at 90° C. a homogeneous mixture composed of

| | |
|---|---|
| 16.2 | g of ammonia (26.5 weight percent of $NH_3$) and |
| 80 | g of water, | followed by the addition of 591 g of water.

Example VI

In a manner analogous to that disclosed in Example V, a dispersion was prepared, with the proviso that the mixture in the flask was composed of:

| | |
|---|---|
| 325 | g of alkyd resin B |
| 50 | g of dipropylene glycol monomethyl ether, and that | the dropping funnel was filled this time with a homogeneous mixture of:

| | |
|---|---|
| 70.1 | g of styrene |
| 30.3 | g of acryiic acid |
| 33.7 | g of methyl methacrylate |
| 35.8 | g of butyl methacrylate |
| 17.5 | g of the reaction product of 1 mole of alkoxypolyoxyethylene/oxypropylene amine and 1 mole of dimethyl-m-isopropenyl benzyl isocyanate |
| 5.1 | g of di-t-butylperoxide. |

On conclusion of the reaction there was added to the contents of the flask at 90° C. a homogeneous mixture of:

| | |
|---|---|
| 16.2 | g of ammonia (26.5 weight percent of $NH_3$) and |
| 80 | g of water, | followed by the addition of 486 g of water.

Example VII

In a manner analogous to that disclosed in Example V, a dispersion was prepared, with the proviso that the mixture in the flask was composed of:

| | |
|---|---|
| 350 | g of alkyd resin C |
| 55 | g of dipropylene glycol monomethyl ether, and that | the dropping funnel was filled this time with a homogeneous mixture of:

| | |
|---|---|
| 60.0 | g of styrene |
| 26.0 | g of acrylic acid |
| 28.9 | g of methyl methacrylate |
| 30.8 | g of butyl methacrylate |
| 4.3 | g of di-t-butyl peroxide |

On conclusion of the reaction there was added to the contents of the flask at 90° C. a homogeneous mixture composed of

| | |
|---|---|
| 13.9 | g of ammonia (26.5 weight percent of $NH_3$) and |
| 80 | g of water, | followed by the addition of 601 g of demineralized water.

Example VIII

In a manner analogous to that disclosed in Example II, a dispersion was prepared, with the proviso that in the flask alkyd resin D was substituted for alkyd resin A. Following neutralization 1816 g of demineralized water were added to the mixture over a period of 3 hours.

Example IX

In a manner analogous to that disclosed in Example II, a dispersion was prepared, with the proviso that in the flask alkyd resin E was substituted for alkyd resin A. Following neutralization 1630 g of demineralized water were added to the mixture over a period of 3 hours.

Example X

In a manner analogous to that disclosed in Example I, a dispersion was prepared, with the proviso that in the flask alkyd resin F was substituted for alkyd resin A. Following neutralization 1542 g of demineralized water were added to the mixture over a period of 3 hours.

Example XI

In a manner analogous to that disclosed in Example I, a dispersion was prepared, with the proviso that this time the dropping funnel was filled with a homogeneous mixture of:

| | |
|---|---|
| 204.7 | g of styrene |
| 95.4 | g of acrylic acid |
| 49.2 | g of methyl methacrylate |
| 160.9 | g of butyl methacrylate |
| 14.8 | g of di-t-butyl peroxide |

On conclusion of the reaction there was added to the contents of the flask at 90° C. a homogeneous mixture of

| | |
|---|---|
| 50.5 | g of ammonia (26.8 weight percent $NH_3$) and |
| 300 | g of water, | followed by the addition of 1719 g of water.

Preparation of the Composite Polymer Dispersions

Example XII

In a 6 l flask fitted with a stirrer, a thermometer, a reflux condenser, and two dropping funnels, a mixture was homogenized which was composed of:

| | |
|---|---|
| 2127.7 | g of the dispersion of Example III |
| 590.3 | g of water |

Dropping funnel A was filled with a pre-emulsion of:

| | |
|---|---|
| 2 | g of sodium dodecyl benzene sulfonate |
| 328 | g of water |
| 680.2 | g of butyl methacrylate |
| 119.8 | g of methyl methacrylate |

Dropping funnel B was filled with a homogeneous mixture of:

| | |
|---|---|
| 4 | g of ammonium persulfate |
| 160 | g of water. |

After deaeration, the flask and the two dropping funnels were brought under a nitrogen atmosphere. The contents of the flask were heated to 80° C., after which, over a period of two hours with this temperature in the flask being maintained, the contents of dropping funnel A and 95 percent of the contents of dropping funnel B were added to the flask. After the contents of the flask had been kept at 80° C. for 30 minutes, the remainder of the contents of dropping funnel B was added to the flask, whereupon the flask was kept at 80° C. for a further hour. Next, there was cooling to ambient temperature, and 3 g of ammonia (26.8 weight percent of $NH_3$) were added.

Example XIII

In a manner analogous to that disclosed in Example XII, a composite polymer dispersion was prepared, with the proviso that the mixture in the flask was composed of:

| | |
|---|---|
| 2144.8 | g of the dispersion of Example IV |
| 365.2 | g of water |

Dropping funnel A was filled with a pre-emulsion of:

| | |
|---|---|
| 6 | g of sodium dodecyl benzene sulfonate |
| 504 | g of water |
| 972 | g of butyl methacrylate, and |
| 228 | g of methyl methacrylate |

Dropping funnel B was filled with a homogeneous mixture of:

| | |
|---|---|
| 6 | g of ammonium persulfate |
| 250 | g of water |

Over a period of two hours and 30 minutes, the contents of dropping funnel A and 95 percent of the contents of dropping funnel B were added to the contents of the flask. On conclusion of the reaction 4.5 g of ammonia (26.8 weight percent of $NH_3$) were added to the product.

Example XIV

In a manner analogous to that disclosed in Example XII, a composite polymer dispersion was prepared, with the proviso that the mixture in the flask was composed of:

| | |
|---|---|
| 2144.7 | g of the polymer dispersion of Example IV |
| 573.3 | g of demineralized water |

The properties of the polymer dispersions prepared as specified in the above examples are listed below in Table 1.

TABLE 1

| Dispersion of particle Example | Solids content (wt. %) | Viscosity (Pa · s.) | pH | Average size (nm) |
|---|---|---|---|---|
| I | 39.5 | 0.81 | 8.1 | 99 |
| II | 39.4 | 1.29 | 1.29 | 89 |
| III | 37.6 | 0.44 | 8.1 | 77 |
| IV | 37.3 | 0.36 | 8.0 | 65 |
| V | 39.5 | 0.30 | 7.7 | 183 |
| VI | 44.0 | 1.42 | 7.8 | 320 |
| VII | 39.0 | 0.33 | 7.7 | 225 |
| VIII | 38.8 | 0.57 | 8.0 | 247 |
| IX | 40.8 | 1.49 | 8.1 | 167 |
| X | 41.2 | 0.63 | 7.9 | 330 |
| XI | 39.4 | 0.46 | 8.0 | 336 |
| XII | 39.9 | 0.13 | 8.0 | 153 |
| XIII | 44.7 | 0.16 | 8.1 | 156 |
| XIV | 39.9 | 0.03 | 7.9 | 164 |

Preparation of the Coating Compositions

The following Examples XV to XXV pertain to a number of pigmented coating compositions according to the invention. These were prepared by the incorporation into the polymer dispersions of Examples I to XI of the following constituents:

1) titanium dioxide in such an amount as to give a pigment/polymer weight ratio=0.65;
2) water dilutable combination drier containing 3 weight percent of Co, 3 weight percent of Ba, and 5 weight percent of Zr, in an amount of 2 weight percent, calculated on the polymer and pigment contents;
3) ethyl methyl ketoxime as anti-skinning agent in an amount of 0.5 weight percent, calculated on the polymer content in the polymer dispersion; and
4) a commercially available thickener, Primal RM-8 (ex Rohm & Haas) in an amount of 1 weight percent, calculated on the polymer content in the polymer dispersion.

The mixtures were shaken with glass beads in a Red-devil shaking machine for 30 minutes, after which the glass beads were removed by filtration. Optionally, demineralized water was added to bring the coating composition to the desired viscosity. The coating compositions had a solids content in the range of 40 to 50 percent.

The pigmented coating compositions according to Examples XXVI to XXVIII were prepared in an analogous manner by the incorporation into the composite polymer dispersions of Examples XII to XIV of the following constituents:

1) titanium dioxide in such an amount as to give a pigment/polymer weight ratio=0.65;
2) water dilutable combination drier containing 3 weight percent of Co, 3 weight percent of Ba, and 5 weight percent of Zr, in an amount of 1 weight percent, calculated on the polymer and pigment contents;
3) methyl ethyl ketoxime as anti-skinning agent in an amount of 0.5 weight percent, calculated on the polymer content;
4) a commercially available thickener, Primal RM-8 (ex Rohm & Haas) in an amount of 0.5 weight percent, calculated on the polymer content;
5) pigment dispersing agent in an amount of 2.5 weight percent, calculated on the pigment content;
6) pigment wetting agent in an amount of 1.25 weight percent, calculated on the pigment content and;

7) anti-foaming agent in an amount of 0.3 weight percent, calculated on the polymer content.

After a maturing period of at least 24 hours the pigmented coating compositions were applied onto a steel panel (Bonder 132) pretreated with zinc phosphate and onto a sheet of glass in a layer thickness of 30 to 40 μm (after curing).

After 1 week of drying at ambient temperature the hardness on the steel panel and the gloss and the water resistance on the sheet of glass were determined. The results are compiled in Table 2. After 8 weeks of drying at ambient temperature the hardness and also the flexibility on the steel panel were determined, the results of the measurements being listed in Table 3. Tables 2 and 3 further include the test results for two pigmented commercially available resins. Of these, Ref. 1 is based on a white spirit (hydrocarbon distillate)-containing alkyd resin and Ref. 2 is based on a water-dilutable acrylic emulsion.

The properties listed in the tables below were determined as follows: The Persoz Hardness was determined in accordance with French Industrial Standard method NF T30-016, the result being expressed in seconds. An acceptable minimum is about 40 seconds. The flexibility of the coating compositions was determined with the ball impact test in accordance with ASTM D2794-69 using a ball weight of 0.908 kg, a ball diameter of 15.9 mm, and an aperture of 16.3 mm. The results are expressed in kg.cm. An acceptable minimum flexibility for the coated side is 35 kg.cm, the maximum measurable value being 85 kg.cm. In addition, the Erichsen indentation test was carried out, the results being expressed in mm: a value >6 indicates a flexible topcoat, while a value of 2 in this test indicates that the topcoat is brittle.

The gloss was determined in accordance with ASTM D-523 at 60° and 20°. A gloss value on a sheet of glass of above 80 at 60° is considered high, while a gloss value of above 90 at 60° is considered very high. The water resistance was determined by immersion in a water-bath of 20° C. for 24 hours, attention being paid to the film's softening and the regeneration time. The test is rated on a 1–10 scale, where "1" is very poor and "10" is excellent.

TABLE 2

| Topcoat on the pigmented coating composition of example | Coating composition based on example | properties after 1 week | | | |
|---|---|---|---|---|---|
| | | on steel Persoz hardn. (sec.) | on glass Water resistance | Glass 60° | 20° |
| XV | I | 70 | 9 | 91 | 82 |
| XVI | II | 72 | 9 | 90 | 80 |
| XVII | III | 75 | 9 | 92 | 84 |
| XVIII | IV | 50 | 9 | 93 | 83 |
| XIX | V | 68 | 8 | 90 | 80 |
| XX | VI | 50 | 7 | 94 | 85 |
| XXI | VII | 56 | 8 | 88 | 74 |
| XXII | VIII | 65 | 9 | 86 | 72 |
| XXIII | IX | 50 | 9 | 86 | 72 |
| XXIV | X | 65 | 9 | 84 | 58 |
| XXV | XI | 55 | 9 | 88 | 64 |
| XXVI | XII | 90 | 8 | 88 | 66 |
| XXVII | XIII | 98 | 8 | 84 | 58 |
| XXVIII | XIV | 92 | 8 | 86 | 62 |
| Ref. 1 | | 70 | 9 | 89 | 80 |
| Ref. 2 | | 82 | 5 | 80 | 55 |

The results listed in Table 2 show that, for a number of compositions, the topcoats applied using the coating compositions according to the invention have even higher gloss than the topcoats applied using the known coating compositions. Moreover, the water resistance of the topcoats using the coating compositions according to the invention ranges from high to very high.

TABLE 3

| Topcoat based on the pigmented coating composition of example | Coating composition based on example | Properties after 1 week | | | |
|---|---|---|---|---|---|
| | | Persoz hardn. (sec.) | on steel Flexibility (kg · cm) coating side | un-coated side | Erichsen indentation (mm) |
| XV | I | 108 | 28 | 8 | >9 |
| XVI | II | 110 | 28 | 8 | 8.9 |
| XVII | III | 127 | 28 | 8 | 8.7 |
| XVIII | IV | 86 | 30 | 6 | >9 |
| XIX | V | 98 | 30 | 6 | >9 |
| XX | VI | 82 | 32 | 8 | >9 |
| XXI | VII | 78 | 34 | 8 | >9 |
| XXII | VIII | 87 | 78 | 66 | 8.6 |
| XXIII | IX | 77 | 44 | 28 | 8.8 |
| XXIV | X | 88 | 66 | >85 | 8.6 |
| XXV | XI | 86 | 66 | >85 | 8.6 |
| XXVI | XII | 122 | 16 | 2 | >9 |
| XXVII | XIII | 130 | 16 | 2 | >9 |
| XXVIII | XIV | 125 | 16 | 2 | >9 |
| Ref. 1 | | 98 | 48 | 22 | 8.4 |
| Ref. 2 | | 110 | 14 | 2 | 7.4 |

The results listed in Table 3 show that the mechanical properties of the topcoats applied using the coating compositions according to the invention are as high as or even superior to those of the topcoats applied using the known coating compositions.

We claim:

1. An air-drying aqueous polymer dispersion comprising an effective air-drying amount of a drier compound and a core/shell polymer with an alkyd resin in the core and an addition polymer grafted thereon, wherein about 50–90 weight percent of the core/shell polymer is composed of alkyd resin and about 50–10 weight percent is composed of addition polymer, with the alkyd resin containing more than 40 and up to 80 weight percent, based on alkyd resin, of unsaturated fatty acid, at least 5 mole percent of which contains conjugated double bonds, having an acid number of not more than 5 (mg KOH/g), and having a number average molecular weight in the range of 400 to 5000, and with the addition polymer having an acid number in the range of 40 to 200 (mg KOH/g), wherein the core/shell polymer is obtained by the addition polymerization of free radical polymerizable monomers in the presence of the alkyd resin.

2. A polymer dispersion according to claim 1, wherein the alkyd resin is composed of:

(a) n moles of an aromatic and/or cycloaliphatic dicarboxylic acid or ester-forming equivalent thereof, (b) x moles of a triol having 3–12 carbon atoms, and/or y moles of a tetrafunctional alcohol having 4–13 carbon atoms, with $x+y=n+1$, (c) $(x+y)$ to $(x+y+2)$ moles of an unsaturated fatty acid, and 2–10 weight percent of a glycidyl ester of a carboxylic acid according to formula (I):

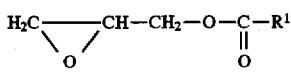

(I)

wherein $R^1$ is an alkyl group having 4–40 carbon atoms.

3. A polymer dispersion according to claim 1, wherein the alkyd resin is composed of:
   (a) n moles of an aromatic and/or cycloaliphatic tricarboxylic acid or ester-forming equivalent thereof,
   (b) x moles of a diol having 2–12 carbon atoms, and/or y moles of a triol having 3–12 carbon atoms, with $x+y=2n+1$,
   (c) $(x+y-1)$ to $(2y+x+1-n)$ moles of an unsaturated fatty acid, and
   (d) 2–10 weight percent of a glycidyl ester of a carboxylic acid according to formula (I):

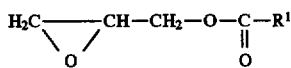

(I)

wherein $R^1$ is an alkyl group having 4–40 carbon atoms.

4. A polymer dispersion according to claim 1, wherein the alkyd resin has a number average molecular weight (Mn) in the range of about 500 to 4000 and a dispersity (Mw/Mn) value of less than about 4 and greater than 1.

5. A polymer dispersion according to claim 1, wherein the acid number of the alkyd resin has a value less than 5 through conversion with a glycidyl ester of a carboxylic acid or some other mono-epoxide.

6. A polymer dispersion according to claim 1, wherein the shell is obtained from a monomer mixture comprising:
   20–50 mole percent of styrene and/or e-methylstyrene,
   20–30 mole percent of (meth)acrylic acid, and
   20–60 mole percent of some other mono-unsaturated compound.

7. A polymer dispersion according to claim 1, wherein the shell incorporates an amount up to about 20 weight percent of a hydroxypolyethylene glycol (meth)acrylate, hydroxypolyethylene glycol/polypropylene glycol (meth)acrylate, hydroxypolypropylene glycol (meth)acrylate or alkoxy derivative thereof, or some other unsaturated monomer containing hydroxy- or alkoxypolyoxyalkylene groups having an Mn in the range of about 500 to 3000.

8. A polymer dispersion according to claim 6, wherein, the shell incorporates an amount up to about 20 weight percent of a hydroxypolyethylene glycol (meth)acrylate, hydroxypolyethylene glycol/polypropylene glycol (meth)acrylate, hydroxypolypropylene glycol (meth)acrylate or alkoxy derivative thereof, or some other unsaturated monomer containing hydroxy- or alkoxypolyoxyalkylene groups having an Mn in the range of about 500 to 3000.

9. A polymer dispersion according to claim 1 wherein at least a portion of the addition polymer's carboxyl groups are neutralized.

10. A coating composition comprising an aqueous polymer dispersion according to claim 1.

11. A coating composition comprising an aqueous polymer dispersion according to claim 6.

12. A coating composition comprising an aqueous polymer dispersion according to claim 7.

13. A coating composition comprising an aqueous polymer dispersion according to claim 8.

14. A coating composition comprising an aqueous polymer dispersion according to claim 9.

15. A cured coating composition produced by curing at ambient temperature a coating composition according to claim 10.

16. A method of producing a cured coating composition the method comprising applying to a substrate a coating composition according to claim 10 and curing at ambient temperature.

17. A topcoat comprising a coating composition according to claim 10.

18. A substrate coated with two coating layers wherein each coating layer comprises a coating composition according to claim 10.

* * * * *